US011155381B1

(12) United States Patent
Sadowski et al.

(10) Patent No.: US 11,155,381 B1
(45) Date of Patent: Oct. 26, 2021

(54) JOINABLE THERMOFORM PRODUCT PACKAGING

(71) Applicant: SEE Forming L.L.C., Appleton, WI (US)

(72) Inventors: Scott James Sadowski, Appleton, WI (US); Mark Allan Erickson, Trevor, WI (US)

(73) Assignee: SEE Forming L.L.C., Appleton, WI (US)

( * ) Notice: Subject to any disclaimer, the term of this patent is extended or adjusted under 35 U.S.C. 154(b) by 85 days.

(21) Appl. No.: 16/594,663

(22) Filed: Oct. 7, 2019

Related U.S. Application Data

(60) Provisional application No. 62/742,536, filed on Oct. 8, 2018.

(51) Int. Cl.
*B65D 21/02* (2006.01)
*B29C 65/58* (2006.01)
*B29C 51/20* (2006.01)

(52) U.S. Cl.
CPC .......... *B65D 21/0201* (2013.01); *B29C 51/20* (2013.01); *B29C 65/58* (2013.01); *B65D 21/0204* (2013.01)

(58) Field of Classification Search
CPC ............ B65D 21/0201; B65D 21/0204; B65D 21/0202; B65D 21/0208; B65D 1/24; B65D 21/0209; B29C 65/58; B29C 51/18
USPC ............................. 220/23.8, 23.4; 206/504
See application file for complete search history.

(56) References Cited

U.S. PATENT DOCUMENTS

| 774,037 A | 11/1904 | Burgi |
| 2,720,969 A | 10/1955 | Kendall |
| 3,933,240 A | 1/1976 | Humble |
| 3,983,996 A | 10/1976 | Hendren, III |

(Continued)

FOREIGN PATENT DOCUMENTS

| DE | 3924138 A1 * | 1/1991 | ........... B65D 43/164 |
| EP | 2206480 A1 | 7/2010 | |
| WO | 2015080578 A1 | 6/2015 | |

OTHER PUBLICATIONS

United States Patent and Trademark Office, Office Action for U.S. Appl. No. 15/714,828 dated Aug. 30, 2019.

(Continued)

*Primary Examiner* — J. Gregory Pickett
*Assistant Examiner* — Sanjidul Islam
(74) *Attorney, Agent, or Firm* — Middleton Reutlinger

(57) ABSTRACT

A package for a product that contains a first and a second thermoform container body that are configured to support the product. The first container body includes a first outer wall extending along a side of the first container body and defining a first mating surface and a first interlocking structure proximate the first outer wall and including an outer surface. The second container body includes a second outer wall extending along a side of the second container body, an inner wall disposed inwardly of the second outer wall and defining a second mating surface, and a second interlocking structure intermediate the second outer wall and the inner wall. The first and second interlocking structures are configured to interlock with one another when the outer surface of the first interlocking structure is placed in facing engagement with the inner surface of the second interlocking structure.

13 Claims, 6 Drawing Sheets

(56) References Cited

U.S. PATENT DOCUMENTS

| | | |
|---|---|---|
| 4,019,633 A | 4/1977 | Roth |
| 4,697,703 A | 10/1987 | Will |
| 4,938,355 A | 7/1990 | Rocco |
| 5,386,908 A | 2/1995 | Sinn |
| 5,501,341 A | 3/1996 | Van Es |
| 5,526,926 A | 6/1996 | Deja |
| 5,590,768 A | 1/1997 | Hilton |
| 5,601,189 A | 2/1997 | Roshdy |
| 5,772,031 A | 6/1998 | Landis |
| 6,047,826 A | 4/2000 | Kalinski |
| 6,123,192 A | 9/2000 | Rufo, Jr. |
| 6,164,446 A | 12/2000 | Law |
| 6,196,388 B1 | 3/2001 | Kaposvari |
| 6,216,885 B1 | 4/2001 | Guillaume |
| D442,697 S | 5/2001 | Hajianpour |
| 6,412,631 B2 | 7/2002 | Belden, Jr. |
| 6,443,300 B1 | 9/2002 | Gelardi |
| 6,527,115 B2 | 3/2003 | Rabiner et al. |
| 6,547,068 B2 | 4/2003 | Chu |
| 6,588,587 B2 | 7/2003 | Johnson et al. |
| 6,839,239 B1 | 1/2005 | Lee |
| 6,892,878 B2 | 5/2005 | Hegarty |
| 6,892,881 B2 | 5/2005 | Leitch |
| 6,915,901 B2 | 7/2005 | Feinberg |
| 6,955,068 B2 | 10/2005 | Gelardi |
| 7,527,148 B2 | 5/2009 | Crouan |
| 7,987,977 B2 | 8/2011 | Leedom et al. |
| 8,109,480 B2 | 2/2012 | Lee |
| 8,657,106 B2 | 2/2014 | Trapp et al. |
| 8,727,117 B2 | 5/2014 | Maasarani |
| 9,265,578 B2 | 2/2016 | Dacey |
| 9,687,300 B2 | 6/2017 | Hartfelder et al. |
| 10,577,165 B2 | 3/2020 | Sadowski et al. |
| 2002/0100701 A1 | 8/2002 | Chiu |
| 2003/0000855 A1* | 1/2003 | Lin .................... G11B 33/0427 206/310 |
| 2003/0121821 A1 | 7/2003 | Roshdy |
| 2004/0007482 A1 | 1/2004 | Wen-Long |
| 2005/0098460 A1 | 5/2005 | Smith |
| 2007/0029216 A1 | 2/2007 | Liu |
| 2011/0315565 A1 | 12/2011 | Chiappini |
| 2012/0247988 A1 | 10/2012 | Lax |
| 2015/0143740 A1* | 5/2015 | Kelly .................... A01K 97/06 43/54.1 |
| 2015/0224247 A1 | 8/2015 | McDorman |
| 2016/0206510 A1 | 7/2016 | Carrel et al. |
| 2016/0304242 A1* | 10/2016 | Nowland .......... B65D 21/0201 |
| 2016/0354151 A1 | 12/2016 | Nadig et al. |
| 2018/0311027 A1 | 11/2018 | Distefano |
| 2018/0370667 A1 | 12/2018 | Bogdziewicz |
| 2019/0092547 A1 | 3/2019 | Sadowski et al. |
| 2019/0106243 A1* | 4/2019 | Maroofian ......... B65D 21/0204 |

OTHER PUBLICATIONS

United States Patent and Trademark Office, Notice of Allowance for U.S. Appl. No. 15/714,828 dated Jan. 13, 2020.

* cited by examiner

JOINABLE THERMOFORM PRODUCT PACKAGING

BACKGROUND

Thermoforming is a relatively fast and inexpensive manufacturing process that is conventionally used to produce various types of products, including packaging for other products. With thermoforming, a plastic sheet is heated to a pliable forming temperature and then formed into a desired three dimensional shape using a mold. Once the plastic material cools, the material retains the shape of the mold, whereby the material may then be removed from the mold, and optionally trimmed and finished, in order to produce the desired end product.

Among numerous other applications, thermoforming is commonly used to produce trays or container bodies for packaging medical devices prior to use. Typical thermoforming machines utilized for these applications are capable of manufacturing trays up to about 30" long; however, some medical devices are much longer (e.g., in excess of 72" long), so packaging such devices in thermoform trays can be problematic, requiring in some instances custom thermoforming machines, which may be cost prohibitive for some medical device applications due to equipment costs and/or smaller production quantities. Alternatively, multiple smaller trays may be joined together to support longer medical devices; however, it has been found that joining thermoform trays together to support larger medical devices can result in insufficient support where the trays are joined together, thereby jeopardizing the integrity of the packaging.

SUMMARY

Apparatuses and methods for product packaging are disclosed herein. An example package for a product, for example, includes a first thermoform container body including a first outer wall extending along a side of the first thermoform container body and defining a first mating surface; a second thermoform container body including a second outer wall extending along a side of the second thermoform container body, the second thermoform container body further including an inner wall disposed inwardly of the second outer wall and defining a second mating surface; a first interlocking structure integrally formed in the first thermoform container body proximate the first outer wall and including an outer surface projecting in a first direction; and a second interlocking structure integrally formed in the second thermoform container body intermediate the second outer wall and the inner wall and including an inner surface with a profile that matches that of the outer surface of the first interlocking structure; where the first and second interlocking structures are respectively configured to interlock with one another when the outer surface of the first interlocking structure is placed in facing engagement with the inner surface of the second interlocking structure; and where the first outer wall of the first thermoform container body and the inner wall of the second thermoform container body are respectively arranged and configured to position the first and second mating surfaces in facing engagement with one another when the first and second interlocking structures are interlocked with one another.

In some embodiments, the first and second thermoform container bodies are identically configured. In some such embodiments, the first and second thermoform container bodies are configured to be stackable. In other embodiments, the first and second mating surfaces restrict bending between the first and second thermoform container bodies when the first and second interlocking structures are interlocked with one another.

In another aspect, a package for a product includes: a thermoform container body including a first outer wall extending along a first side of the thermoform container body and defining a first mating surface, a second outer wall extending along a second side of the thermoform container body, and a first inner wall disposed inwardly of the second outer wall and defining a second mating surface; a first interlocking structure integrally formed in the thermoform container body proximate the first outer wall and including a first outer surface projecting in a first direction; and a second interlocking structure integrally formed in the thermoform container body intermediate the second outer wall and the first inner wall and including a first inner surface with a profile that matches that of the first outer surface of the first interlocking structure; where the first interlocking structure is configured such that the first interlocking structure is interlockable with a third interlocking structure of a different thermoform container body that is similarly configured as the second interlocking structure when the first outer surface of the first interlocking structure is placed in facing engagement with a second inner surface of the third interlocking structure; where the second interlocking structure is configured such that the second interlocking structure is interlockable with a fourth interlocking structure of the different thermoform container body that is similarly configured as the first interlocking structure when the first inner surface of second first interlocking structure is placed in facing engagement with a second outer surface of the fourth interlocking structure; where the first outer wall of the thermoform container body is arranged and configured to position the first mating surface in facing engagement with a third mating surface of a second inner wall of the different thermoform container body when the first and third interlocking structures are interlocked with one another; and where the first inner wall of the thermoform container body is arranged and configured to position the second mating surface in facing engagement with a fourth mating surface of a third outer wall of the different thermoform container body when the second and fourth interlocking structures are interlocked with one another.

In some embodiments, the thermoform container body has a top surface, the first and second interlocking structures are disposed at opposite ends of the thermoform container body, and the first and second interlocking structures are upwardly facing. In some such embodiments, the second outer wall projects downwardly a first distance from the top surface, and where the first outer wall and the first inner wall each project downwardly a greater distance than the first distance. In some embodiments, the first interlocking structure further includes recessed wall disposed on an opposite side of the first interlocking structure from the first outer wall and extending downwardly at least the first distance. In other embodiments, the first and second interlocking structures each include a beveled recess extending generally parallel to the respective first and second outer walls, each beveled recess including first and second opposing tabs projecting from first and second sidewalls thereof. In still other embodiments, the first and second mating surfaces extend at supplementary angles relative to the top surface.

In some embodiments, each of the first and second interlocking structures includes a tab. In some such embodiments, the tab is formed using a mold including an articulating lock that is movable between molding and release positions. In some embodiments, the articulating lock defines an undercut for the tab, is movable horizontally and vertically between the molding position and the release position, and is biased towards the molding position.

In some embodiments, the first and second mating surfaces restrict bending between the container body and the different container body.

In still another aspect, a mold for use in a product packaging container includes: a first outer wall portion configured to define a first outer wall extending along a first side of a thermoform container body and defining a first mating surface; a second outer wall portion configured to define a second outer wall extending along a second side of the thermoform container body; a first inner wall portion configured to define a first inner wall disposed inwardly of the second outer wall and defining a second mating surface; a first interlocking structure portion configured to define a first interlocking structure integrally formed in the thermoform container body proximate the first outer wall and including a first outer surface projecting in a first direction; and a second interlocking structure portion configured to define a second interlocking structure integrally formed in the thermoform container body intermediate the second outer wall and the first inner wall and including a first inner surface with a profile that matches that of the first outer surface of the first interlocking structure; where the first interlocking structure is configured such that the first interlocking structure is interlockable with a third interlocking structure of a different thermoform container body that is similarly configured as the second interlocking structure when the first outer surface of the first interlocking structure is placed in facing engagement with a second inner surface of the third interlocking structure; where the second interlocking structure is configured such that the second interlocking structure is interlockable with a fourth interlocking structure of the different thermoform container body that is similarly configured as the first interlocking structure when the first inner surface of second first interlocking structure is placed in facing engagement with a second outer surface of the fourth interlocking structure; where the first outer wall of the thermoform container body is arranged and configured to position the first mating surface in facing engagement with a third mating surface of a second inner wall of the different thermoform container body when the first and third interlocking structures are interlocked with one another; and where the first inner wall of the thermoform container body is arranged and configured to position the second mating surface in facing engagement with a fourth mating surface of a third outer wall of the different thermoform container body when the second and fourth interlocking structures are interlocked with one another.

In some embodiments, the mold additionally includes one or more articulating locks.

In still yet another aspect, a method of joining a first and a second thermoform body includes: obtaining a first thermoform container body including a first outer wall extending along a side of the first thermoform container body and defining a first mating surface and a first interlocking structure integrally formed in the first thermoform container body proximate the first outer wall and including an outer surface projecting in a first direction; obtaining a second thermoform container body including a second outer wall extending along a side of the second thermoform container body, an inner wall disposed inwardly of the second outer wall and defining a second mating surface, and a second interlocking structure integrally formed in the second thermoform container body intermediate the second outer wall and the inner wall and including an inner surface with a profile that matches that of the outer surface of the first interlocking structure; interlocking the first and second interlocking structures such that the first and second mating surfaces are in facing engagement with one another.

In some embodiments, the method of joining the first and second thermoform bodies additionally includes separating the first and second thermoform bodies by bending the first and second thermoform bodies in a direction that separates the first and second mating surfaces from one another.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the present disclosure.

DETAILED DESCRIPTION

Embodiments consistent with the invention may be used to join multiple thermoform container bodies or trays together using cooperative interlocking structures disposed on the thermoform container bodies or trays, in combination with cooperative inner and outer walls that face one another to place opposing mating surfaces in facing engagement with one another to resist bending between the thermoform container bodies or trays when interlocked.

In some embodiments, once the container bodies are interlocked, they are difficult to separate, thereby providing a stable and sturdy assembly. More than two container bodies may be joined together in some embodiments, and although dissimilar container bodies may be joined together in some embodiments, in other embodiments all of the container bodies may be of an identical design such that any number of container bodies may be joined together as desired. Further, where the container bodies are of an identical design, the container bodies may also be designed to be stackable and nestable to minimize the space occupied by such container bodies prior to use in product packaging and/or after separation. Separation may be used, for example, to downsize for packaging disposal, and in some embodiments may occur when the joints between interlocked container bodies are bent in an opposite direction of strength (i.e., in a direction that separates the opposing mating surfaces) and the container bodies either bend or break apart.

In some embodiments, once interlocked, the mating surfaces in contact with each other strengthen the overall assembly, and it is believed that in many embodiments, the thickness of the plastic sheet used to form a container body may be reduced substantially (e.g., up to about 66%) to provide a significant cost and material savings. In addition, in many embodiments a container body may be fabricated with a planar or two-dimensional trim surface, which generally reduces tooling cost and the complexity of multi-level or contour trims.

Embodiments consistent with the invention may provide a container body with interlocking structures suitable for interlocking with dissimilar or identical container bodies, and with inner and outer walls that mate with one another on opposing container bodies to provide additional support for the finished assembly.

Figure 1:
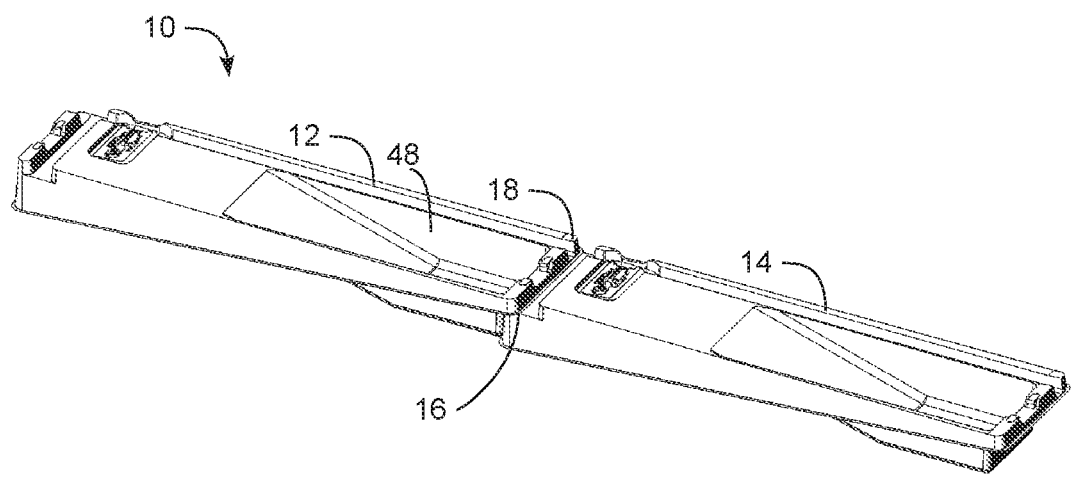
FIG. 1 is a perspective view of one embodiment of a joinable thermoform product packaging system consistent with the invention.
Figure 2:
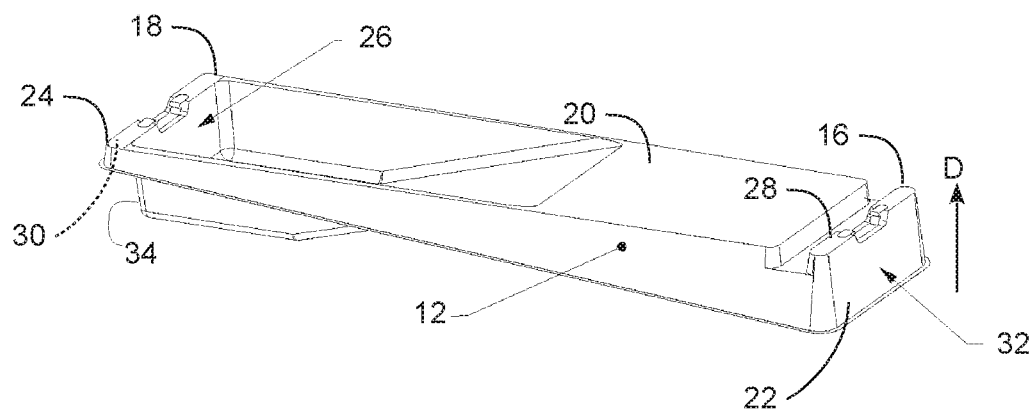
FIG. 2 is a perspective view of a thermoform container body from the joinable thermoform product packaging system of FIG. 1.
Figure 3:
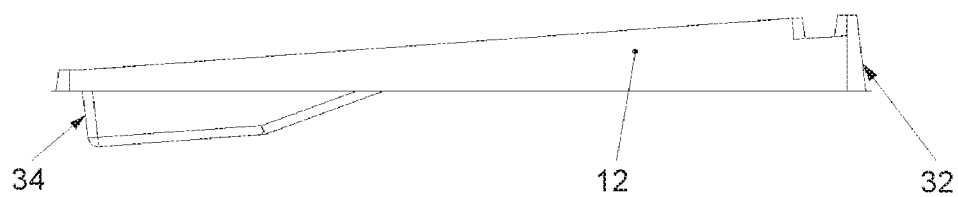
FIG. 3 is a side elevational view of the thermoform container body of FIG. 2.

FIG. 1, for example, illustrates an example embodiment of a joinable thermoform product packaging system 10 including first and second thermoform container bodies 12, 14 joined together using respective interlocking structures 16, 18. In the illustrated embodiment, container bodies 12, 14 are identically configured, and further, are designed to be stackable and nestable, although the invention is not so limited.

FIGS. 2-6 illustrate container body 12 in greater detail. Container body 12 is formed from a plastic sheet and is molded to include a top surface 20, a pair of outer walls 22, 24 and an inner wall 26. Outer walls 22, 24 are respectively disposed at opposing ends of the container body proximate interlocking structures 16, 18 and may form portions of a continuous outer side wall that extends around the periphery of the container body to form sides of the container body. Inner wall 26 is disposed inwardly of outer wall 24 and is formed via a depression in the interior of the container body, and may be used to define a container portion 48 within which at least a portion of a packaged product may be housed. It will be appreciated that given the innumerable types of products that may be packaged in a thermoform container body, the profile of container body 12 may vary considerably in different embodiments, so the invention is not limited to the particular profile illustrated herein.

Interlocking structure 16 is a male or positive interlocking structure that is integrally formed in the container body proximate outer wall 22, and includes an outer surface 28 projecting generally in a direction D, while interlocking structure 18 is a female or negative interlocking structure that is integrally formed in the container body intermediate outer wall 24 and inner wall 26 and includes an inner surface 30 with a profile that matches that of outer surface 28 of interlocking structure 16. In some embodiments, interlocking structures 16, 18 have effectively the same profile or shape, but with interlocking structure 16 being slightly smaller in scale to fit within interlocking structure 18 with outer and inner surfaces 28, 30 in operative contact with one another. Further, in some embodiments, both the top-facing and side-facing portions of these surfaces are respectively sized to restrict movement between interlocking structures 16, 18 in multiple directions when interlocked, although the invention is not so limited.

Outer wall 22 and inner wall 26 each define a respective mating surface 32, 34 over at least a portion of the respective wall, and which is arranged and configured to form a facing engagement with a corresponding mating surface of another container body.

Figure 7:
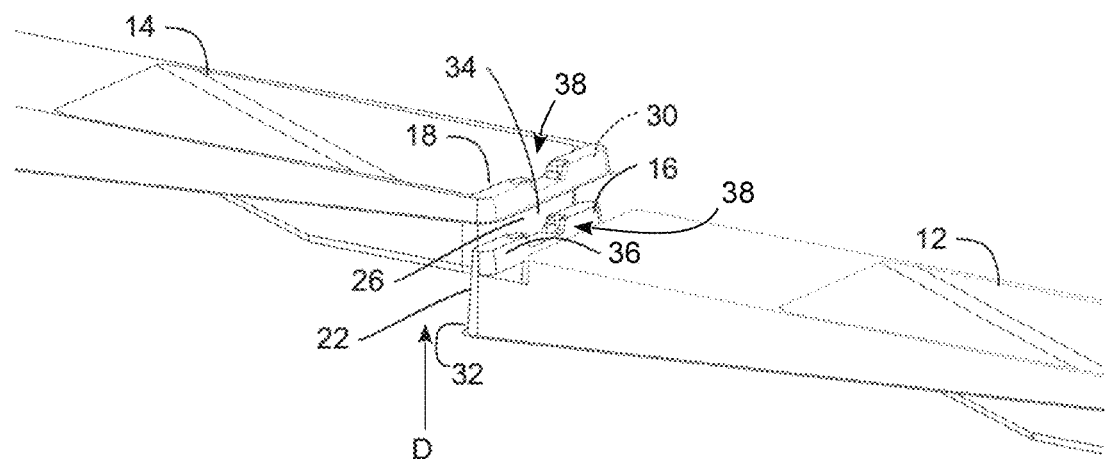
FIG. 7 is an enlarged perspective view of a pair of thermoform container bodies in the joinable thermoform product packaging system of FIG. 1, and prior to be joined together.
Figure 8:
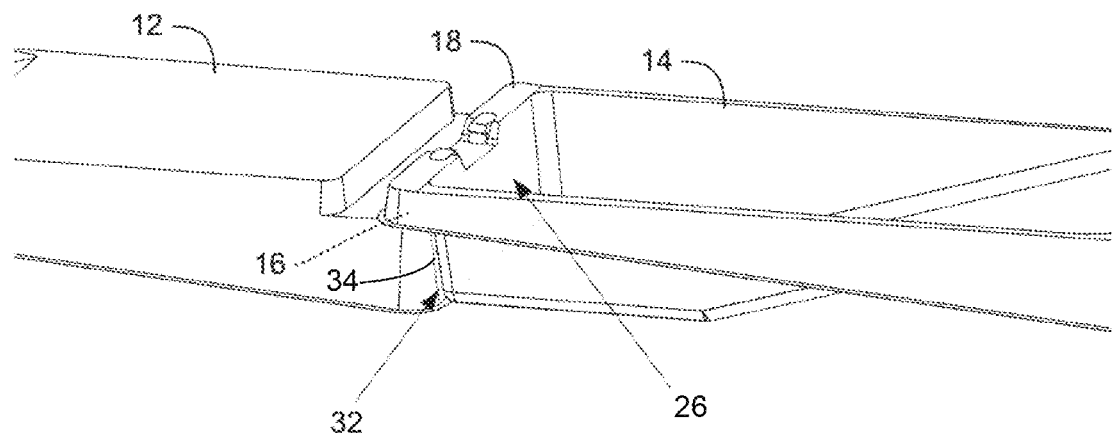
FIG. 8 is an enlarged perspective view of the pair of thermoform container bodies of FIG. 7, after being joined together.

As illustrated in FIGS. 7 and 8, interlocking structures 16, 18 are respectively configured to interlock with one another when outer surface 28 of interlocking structure 16 is placed in facing engagement with inner surface 30 of interlocking structure 18 (e.g., by moving container body 14 towards container body 12 in direction D (and/or moving container body 12 in the opposite direction). When this occurs, outer wall 22 and inner wall 26 are respectively arranged and configured to position mating surfaces 32, 34 in facing engagement with one another, i.e., an engagement where the contours of the mating surfaces match up with one another to place both mating surfaces in contact with one another. It will be appreciated that the mating surfaces may be disposed over the entire outer and inner walls in some embodiments, while in other embodiments the mating surfaces may only cover a portion of the respective walls, so long as the mating surface mate with one another a sufficient amount to resist relative bending between container bodies 12, 14 when interlocking structures 16, 18 are interlocked with one another.

Mating surfaces 32, 34 in some embodiments may be substantially orthogonal to top surface 20, while in other embodiments, non-orthogonal surfaces may be used. In some embodiments, for example, it may be desirable to utilize mating surfaces that extend at supplementary angles relative to top surface 20 such that the mating surfaces will be face one another when the interlocking structures are interlocked.

In the illustrated embodiment, interlocking structures 16, 18 are disposed at opposite ends of the container body, and may be considered to be upwardly facing, although it will be appreciated that the references to relative directions are dependent upon the orientation of the container body, so the "top" of the container body, which generally corresponds to the exterior surface of the plastic sheet that faces away from the base of the mold during the thermoforming process, is not necessarily the top of the container body during use. Also in the illustrated embodiment, outer wall 24 projects downwardly (i.e., away from top surface 20) a first distance, and each of outer wall 22 and inner wall 26 projects downwardly a greater distance than the first distance. Further, in order to fully receive interlocking structure 16 into interlocking structure 18, a recessed wall 36 may be disposed on an opposite side of interlocking structure 16 from outer wall 22, and may extend downwardly at least the distance to which outer wall 24 extends.

Figure 4:
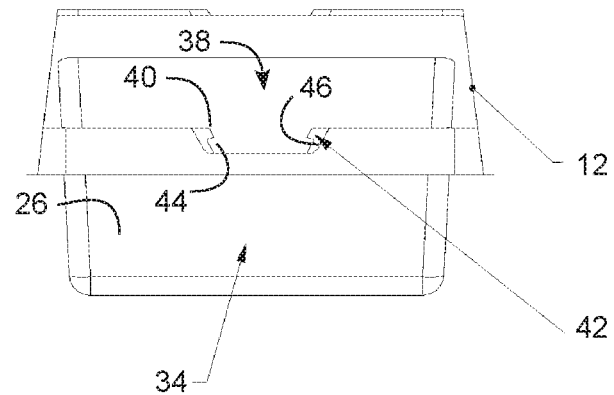
FIG. 4 is an end elevational view of the thermoform container body of FIG. 2.
Figure 5:
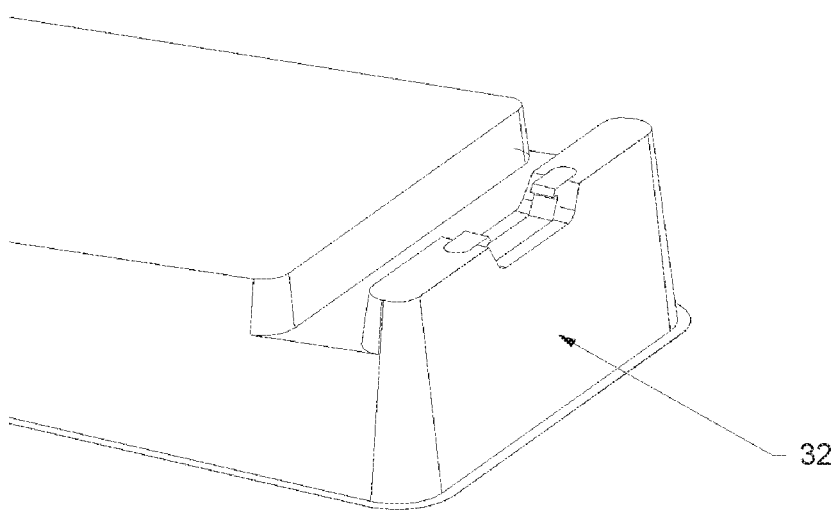
FIG. 5 is an enlarged perspective view of an outer wall end of the thermoform container body of FIG. 2.
Figure 6:
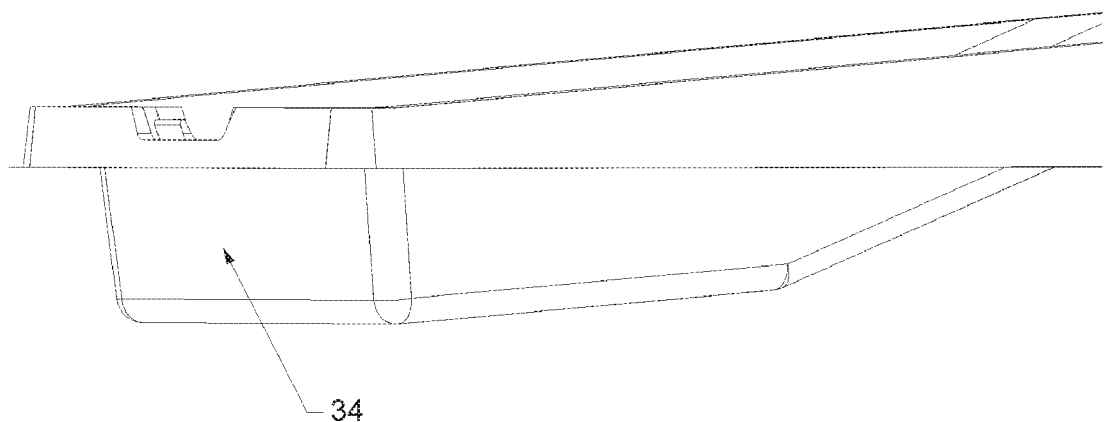
FIG. 6 is an enlarged perspective view of an inner wall end of the thermoform container body of FIG. 2.

As best illustrated in FIG. 4, each interlocking structure 16, 18 may include a beveled recess 38 extending generally parallel to the respective outer walls 22, 24, and each beveled recess 38 may include first and second opposing tabs 40, 42 projecting from first and second sidewalls thereof 44, 46. Tabs 40, 42 serve to restrict separation of interlocking structures 16, 18 when interlocked, and it will be appreciated that various tab geometries, including different numbers, arrangements, and/or positions of tabs may be used in other embodiments.

In some embodiments, tabs 40, 42 utilized in each interlocking structure 16, 18 may be similar in construction to the tab portions of the key supports described in greater detail in U.S. Ser. No. 15/714,828 (the '828 Application) filed on Sep. 25, 2018, which is incorporated by reference herein. Moreover, formation of the tabs in each interlocking structure may utilize articulating locks in some embodiments, similar to those used in mold 1300 of FIGS. 9-12, which is described in greater detail in the aforementioned '828 Application.

Figure 9:
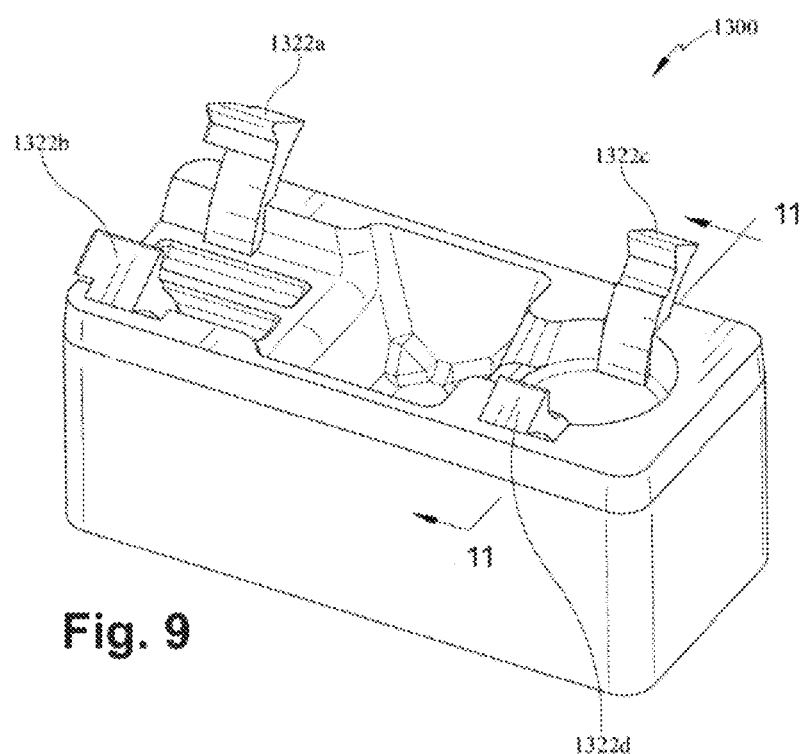
FIG. 9 is a perspective view of an embodiment of a mold in a released position.
Figure 10:
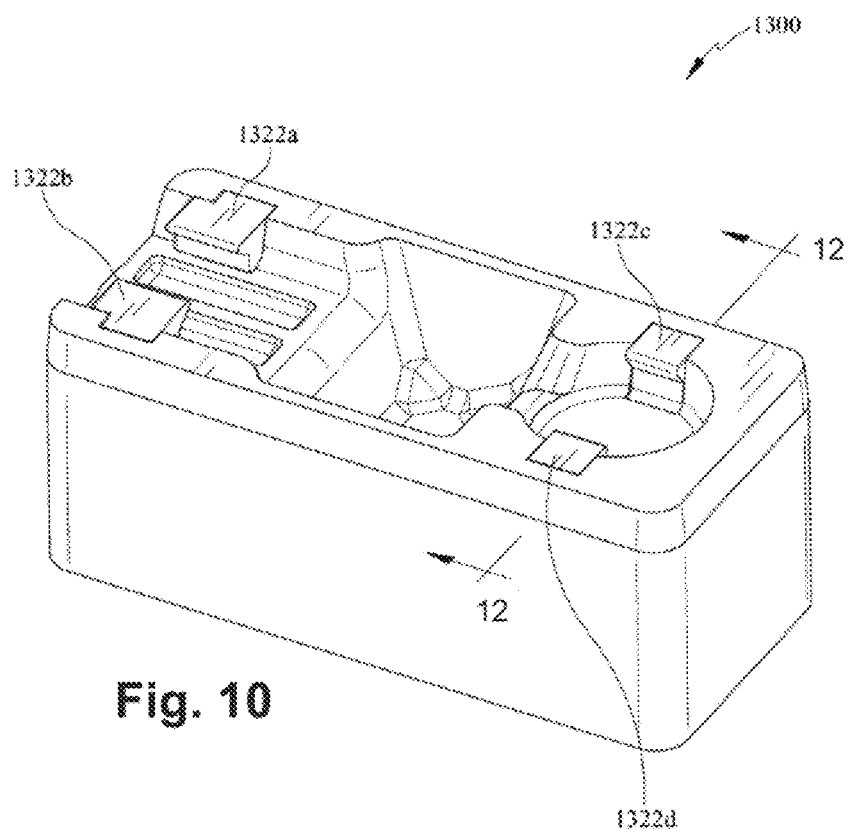
FIG. 10 is a perspective view of the mold of FIG. 9 in a molding position.
Figure 11:
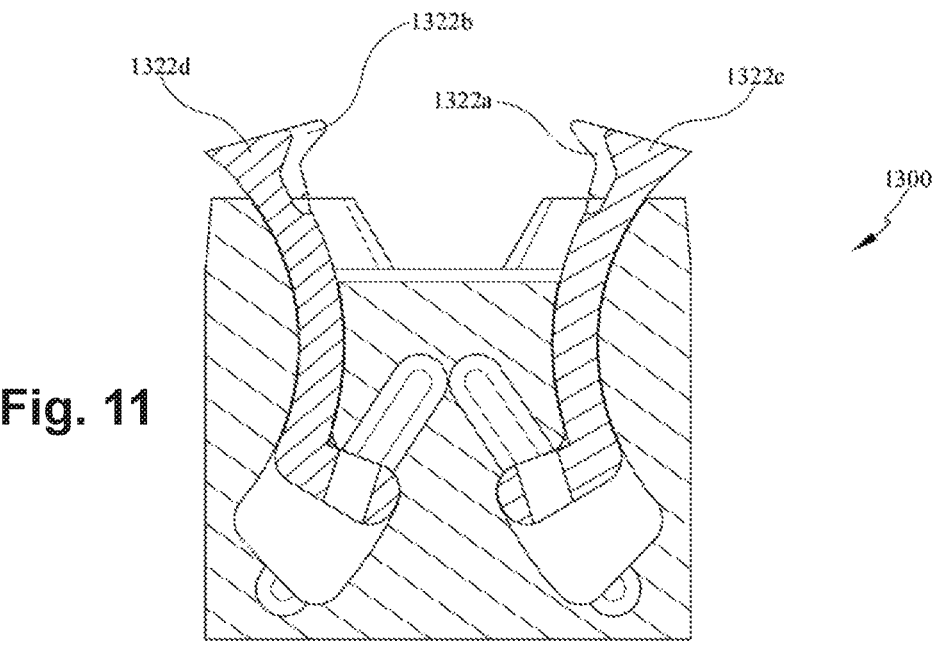
FIG. 11 is a cross-section taken along the line 11-11 of FIG. 9.
Figure 12:
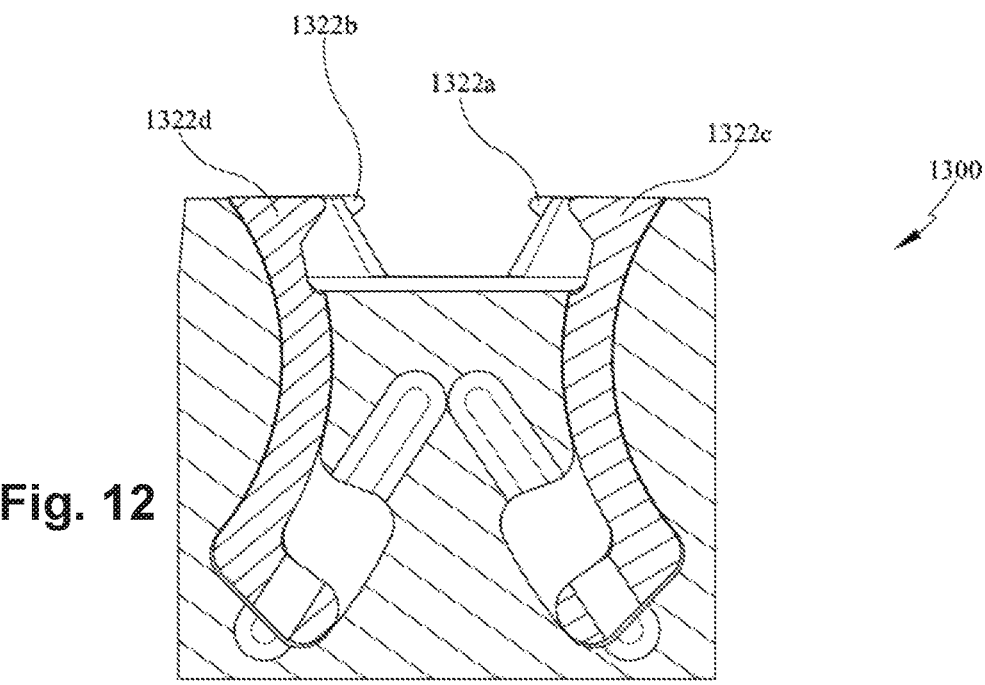
FIG. 12 is a cross-section taken along the line 12-12 of FIG. 10.

FIGS. 9 and 11 in particular illustrate the articulating locks in a released position, after molding is complete, while FIGS. 10 and 12 illustrate the articulating locks in a molding position (it will be appreciated that mold 1300 is not used to form the specific container bodies illustrated herein, and is only depicted by way of example to illustrate articulating locks suitable for forming tabs in interlocking structures). Channel bodies 1322*a*, 1322*b*, 1322*c* and 1322*d* may be articulating, moving between a released position, as illustrated in FIGS. 9 and 11, and a molding position, as illustrated in FIGS. 10 and 12. Some roll-fed in-line thermoforming processes may be limited in terms of the amount of undercut that may be formed in a molded container. For example, it has been found that for some roll-fed in-line thermoforming processes, e.g., those which cycle about 5 to about 40 cycles or more per minute, undercuts greater about 0.040" may cause molded parts to stick in a mold and/or may cause damage to the parts or the tooling itself when removing the molded parts from the mold. Further, such undercuts may need to be designed with a radius or angled face in order to reduce the holding force of the mold, as the more horizontal the undercut, generally the larger the holding force will be, thus making the part more likely to stick or become distorted when being removed from the mold.

It may be desirable in some embodiments for the interlocking structures to include undercuts sized in excess of 0.060", e.g., in order to form tabs as described above. Thus, in some embodiments, one or more articulating locks 1322*a*, 1322*b*, 1322*c*, 1322*d* may be incorporated into mold 1300, and may be spring loaded or otherwise biased toward a molding position. These articulating locks may move horizontally and vertically from a molding position to a release position when the mold and product (e.g., the aforementioned container bodies) are separated, enabling the thermoforming of interlocking structure tabs with more substantial undercuts in a thermoforming process. The curved nature of the articulating locks allows them to move along an arcuate path between released and molding positons. In some embodiments such articulating locks may slide from a molding position to a release position; while in other embodiments, the articulating locks may pivot from a molding position to a release position. As illustrated in FIGS. 9-11, the articulating locks 1322*a*, 1322*b*, 1322*c*, 1322*d* may define an undercut for the object to be formed (e.g. the aforementioned container bodies) and may move from a molding position to a release position.

It will be appreciated that other locking mechanisms may be used in other interlocking structures to interlock or join container bodies together. For example, in some embodiments, button locks and/or staples may be used to restrict separation of interlocking structures once interlocked with one another.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

We claim:

1. A package for a product, comprising:
   a first thermoform container body including a first outer wall extending along a side of the first thermoform container body and defining a first mating surface;
   a second thermoform container body including a second outer wall extending along a side of the second thermoform container body, the second thermoform container body further including an inner wall disposed inwardly of the second outer wall and defining a second mating surface;
   a first interlocking structure integrally formed in the first thermoform container body proximate the first outer wall and including an outer surface projecting in a first direction; and
   a second interlocking structure integrally formed in the second thermoform container body intermediate the second outer wall and the inner wall and including an inner surface with a profile that matches that of the outer surface of the first interlocking structure;
   wherein the first and second interlocking structures are respectively configured to interlock with one another when the outer surface of the first interlocking structure is placed in facing engagement with the inner surface of the second interlocking structure;
   wherein the first outer wall of the first thermoform container body and the inner wall of the second thermoform container body are respectively arranged and configured to position the first and second mating surfaces in facing engagement with one another when the first and second interlocking structures are interlocked with one another; and
   wherein the second outer wall extends downwardly from a top surface of the second interlocking structure a first distance and the first outer wall of the first thermoform container body and the inner wall of the second thermoform container body are respectively arranged and configured to position the first and second mating surfaces such that at least portions of the first and second mating surfaces that are in facing engagement with one another are a greater distance from the top surface of the second interlocking structure than the first distance to resist bending between the first and second thermoform container bodies when the first and second interlocking structures are interlocked with one another.

2. The package of claim 1, wherein the first and second thermoform container bodies are identically configured.

3. The package of claim 2, wherein the first and second thermoform container bodies are configured to be stackable.

4. The package of claim 1, wherein each of the first and second interlocking structures includes a tab.

5. The package of claim 4, wherein the tabs of the first and second interlocking structures have respective geometries that restrict separation of the first and second interlocking structures when the first and second interlocking structures are interlocked with one another.

6. A package for a product, comprising:
   a thermoform container body including a first outer wall extending along a first side of the thermoform container body and defining a first mating surface, a second outer wall extending along a second side of the thermoform container body, and a first inner wall disposed inwardly of the second outer wall and defining a second mating surface;
   a first interlocking structure integrally formed in the thermoform container body proximate the first outer wall and including a first outer surface projecting in a first direction; and
   a second interlocking structure integrally formed in the thermoform container body intermediate the second outer wall and the first inner wall and including a first inner surface with a profile that matches that of the first outer surface of the first interlocking structure;
   wherein the first interlocking structure is configured such that the first interlocking structure is interlockable with a third interlocking structure of a different thermoform container body that is similarly configured as the second interlocking structure when the first outer surface of the first interlocking structure is placed in facing engagement with a second inner surface of the third interlocking structure;
   wherein the second interlocking structure is configured such that the second interlocking structure is interlockable with a fourth interlocking structure of the different thermoform container body that is similarly configured as the first interlocking structure when the first inner surface of second first interlocking structure is placed in facing engagement with a second outer surface of the fourth interlocking structure;
   wherein the first outer wall of the thermoform container body is arranged and configured to position the first mating surface in facing engagement with a third mating surface of a second inner wall of the different thermoform container body when the first and third interlocking structures are interlocked with one another;

wherein the first inner wall of the thermoform container body is arranged and configured to position the second mating surface in facing engagement with a fourth mating surface of a third outer wall of the different thermoform container body when the second and fourth interlocking structures are interlocked with one another;

wherein the second outer wall extends downwardly from a top surface of the second interlocking structure a first distance and the first outer wall and the first inner wall project downwardly a greater distance than the first distance such that at least a portion of the first mating surface that is in facing engagement with the third mating surface is a greater distance from the top surface of the second interlocking structure than the first distance and at least a portion of the second mating surface that is in facing engagement with the fourth mating surface is a greater distance from the top surface of the second interlocking structure than the first distance.

7. The package of claim 6, wherein the thermoform container body has a top surface, the first and second interlocking structures are disposed at opposite ends of the thermoform container body, and the first and second interlocking structures are upwardly facing.

8. The package of claim 7, wherein the first interlocking structure further includes recessed wall disposed on an opposite side of the first interlocking structure from the first outer wall and extending downwardly at least the first distance.

9. The package of claim 7, wherein the first interlocking structure includes a first beveled recess extending generally parallel to the first outer wall and the second interlocking structure includes a second beveled recess extending generally parallel to the second outer wall, and wherein the first beveled recess includes first and second opposing tabs projected from first and second sidewalls of the first interlocking structure and the second beveled recess includes first and second opposing tabs projected from first and second sidewalls of the first interlocking structure.

10. The package of claim 7, wherein the first and second mating surfaces extend at supplementary angles relative to the top surface.

11. The package of claim 6, wherein each of the first and second interlocking structures includes a tab.

12. The package of claim 6, wherein the first and second mating surfaces restrict bending between the container body and the different container body.

13. The package of claim 11, wherein the tabs of the first and second interlocking structures have respective geometries that restrict separation of the first interlocking structure from the third interlocking structure when the first and third interlocking structures are interlocked with one another and that restrict separation of the second interlocking structure from the fourth interlocking structure when the second and fourth interlocking structures are interlocked with one another.

* * * * *